United States Patent Office

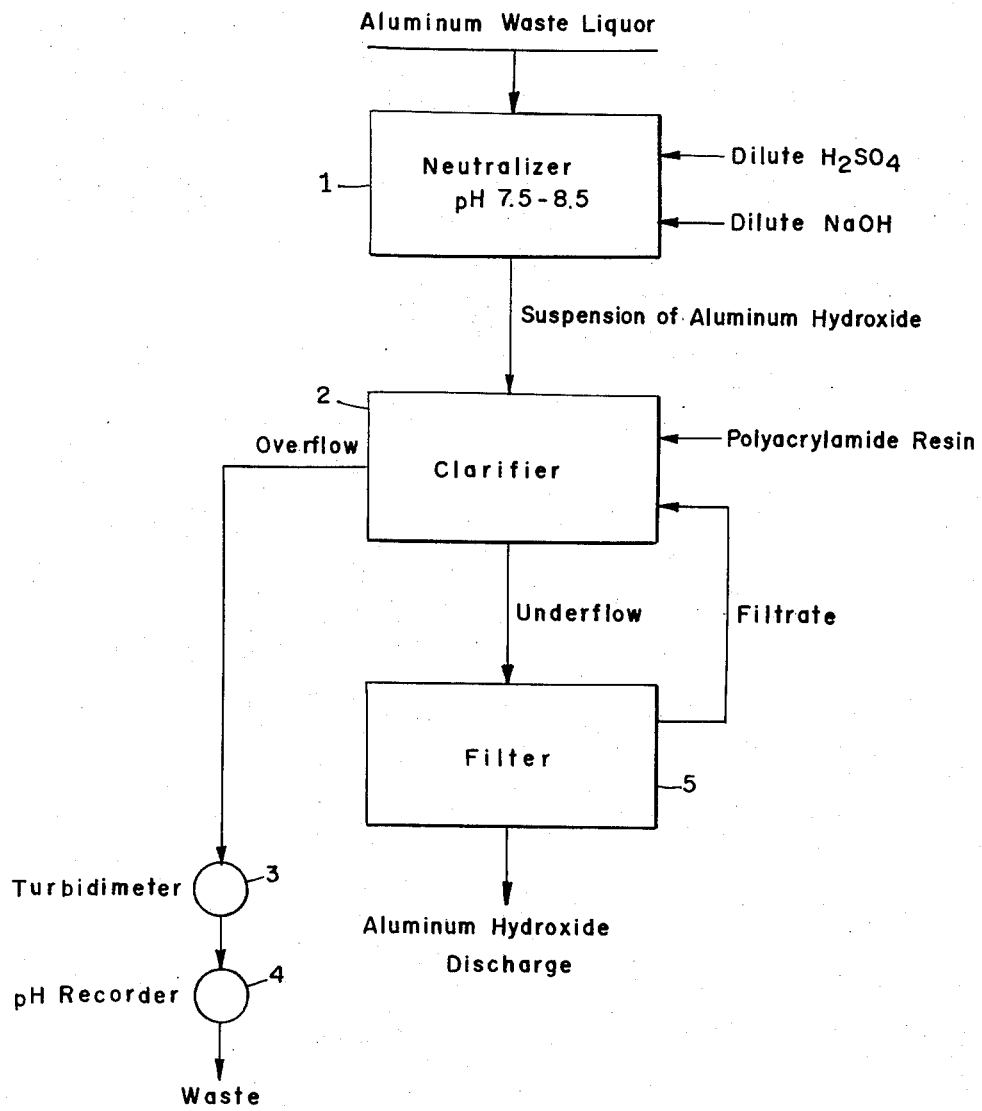

3,798,160
Patented Mar. 19, 1974

3,798,160
TREATMENT OF ALUMINUM WASTE LIQUORS
Clifton J. Huffman, Niles, Mich., assignor to American Metal Climax, Inc., New York, N.Y.
Filed Mar. 29, 1971, Ser. No. 128,807
Int. Cl. B01d 21/01; C01f 7/34
U.S. Cl. 210—53                                     5 Claims

ABSTRACT OF THE DISCLOSURE

Method of recovering aluminum values from aluminum waste liquor which comprises adjusting the pH of the liquor to 6 to 8.5, thus causing precipitation of aluminum hydroxide, adding sufficient polyacrylamide resin solution to produce a concentration of 1 to 5 p.p.m. of resin in the liquor, allowing the aluminum hydroxide precipitate to settle in a thickener, withdrawing the supernatant liquid from said thickener, removing the precipitate from said thickener by filtration, recycling the filtrate to the thickener, and collecting the aluminum hydroxide filter cake from the filter.

---

This invention relates to the treatment of aluminum waste liquors, and particularly to waste acid and alkaline liquors from aluminum anodizing processes. More specifically, this invention relates to the recovery of aluminum hydroxide from waste liquors containing aluminum values.

BACKGROUND OF THE INVENTION

In the anodizing of aluminum, the metal is cleaned with a detergent solution, rinsed, etched with a dilute (ca. 3–10% caustic soda solution, rinsed, anodized in a dilute (ca. 18–25%) sulfuric acid anodizing solution, and rinsed. The rinse liquors from both the alkali etching and the acid anodizing process constitute waste liquors, containing about 1% aluminum or less, which must be treated before they can be discharged into surface waterways or municipal sewage systems. They must be treated to adjust the pH thereof and to remove settable solids, particularly aluminum hydroxide. The problem of treatment of aluminum waste liquors has been growing in importance over the past several years to a point where it now is a major issue in the industry. Lack of adequate waste treatment can lead to the shuttering down of a plant.

Acid and alkaline liquors containing dissolved aluminum values can be neutralized by addition of acid or alkali. The pH is usually adjusted to a value in the range of 6 to 8.5, usually about 7.5 to 7.8. This causes the precipitation of aluminum hydroxide which has its minimum solubility at a pH of 7.8. Aluminum hydroxide forms a milky precipitate which is slow to coagulate and difficult to remove from aqueous solutions in which it is suspended.

It is an object of this invention to provide procedures for removing settable solids from aluminum waste liquors. It is a further object to provide procedures for producing effluent liquors which meet standards of sewage disposal plants with respect to pH and suspended solids. It is a further object to provide a procedure for coagulating liquors containing aluminum hydroxide to speed the removal thereof. Another object is to recover valuable aluminum compounds from waste liquors containing aluminum values.

The removal of suspensed aluminum hydroxide from waste water is ordinarily a major problem due to the large volumes of fluids and the low concentration of solids (250–750 p.p.m.) therein. The size and cost of equipment for such removal are prohibitively high. For instance, studies have shown that, because the settling rate of aluminum hydroxide suspensions is extremely slow, very large thickening equipment would be required to reduce the water content of an aluminum hydroxide suspension from the waste liquors of an aluminum anodizing plant. The aluminum hydroxide floc is quite voluminous and slimy, particularly when produced from sodium aluminate solutions. The volume of the aluminum hydroxide precipitate which creates a sludge, and the fact that the sludge cannot be easily compressed or thickened, cause the difficulties with conventional aluminum process waste treatment.

It has been known that one gram of aluminum (in the form of sodium aluminate) per liter of liquor will create on neutralization 600 ml. of sludge, and this sludge does not thicken after three hours of standing. The dry solids content of this sludge is usually only about 0.5%. These figures are considerably higher than those normally encountered in rinse waters coming from an aluminum anodizing line. In such an operation, the rinse waters on neutralization give sludge volumes of 15–20%, that is, 150–200 ml. of sludge from one liter of rinse water. The dry solids content of these sludges runs as low as 0.17%. In general, the volume of sludge will be between 600 ml. and 1800 ml. per gram of aluminum in the rinse water. After thickening, this sludge contains between 1.5% and 2.5% aluminum hydroxide (dry weight basis). This sludge can be further thickened in a sludge filter to 5–10% dry weight content.

GENERAL DESCRIPTION OF THE INVENTION

In accordance with this invention, an anionic resin is added in relatively small quantities (one or four parts per million) to the aluminum waste liquor following the adjustment of pH of the liquor to the range of 6 to 8.5. The anionic resin aids and assists the rapid coagulation and precipitation of aluminum hydroxide which is formed in a suspension. By coagulation with the aid of the anionic resin, it is possible to clarify or thicken the aluminum hydroxide suspension to form a precipitate containing approximately 2–4% solids. This can then be dewatered by a vacuum or pressure filtration to produce a thickened suspension containing 16–50% solids. The effluent or filtrate from this operation contains sodium sulfate which can be discharged to a sewage system or waterway without creating problems.

One advantage in concentrating the aluminum hydroxide suspension to 16–50% solids in accordance with this procedure is that there is produced an aluminum hydroxide paste which can be treated with concentrated sulfuric acid to produce an aluminum sulfate solution containing 28% aluminum sulfate which is commercially useful as a flocculent for other types of waste water treatment.

The invention is disclosed in more detail in conjunction with the attached drawing which is a flow sheet for the treatment of aluminum anodizing waste liquors, having pH values between 4 and 12. These liquors are passed through a neutralizing tank 1 where the pH is adjusted to 7.5–8.5 with acid or alkali, as required. If the waste liquors are acidic (e.g., from the anodizing rinse) they are preferably treated with alkaline liquors from the alkali etching rinse, and if they are alkaline, an acid liquor is preferably used. Conventional automatic control equipment (not shown) controls the addition of spent acidic or alkaline liquors to adjust the pH to the desired range. In either procedure the pH is brought to a value near 7.8, at which point aluminum hydroxide precipitates, forming a suspension ordinarily containing about 800 parts of solids per million parts of water.

The aluminum hydroxide suspension is pumped to a circular thickener or clarifier 2 where a solution of high molecular weight anionic resin is added to facilitate settling of solids. The quantity of resin added (usually as .020–.050% aqueous solution) is selected to produce a final resin concentration of 1–4 parts per million part of liquor. The solids settle to the bottom of the thickener 2 and the clear effluent overflows to the sewage system, control of this effluent being conducted by means of a turbidimeter 4 and a pH recorder 5. The underflow from the thickener consists of 10–15% of the feed volume and is a soupy suspension containing 2–4% solids. It is fed to a drum-type vacuum or pressure filter 6. A paste consisting of 16–20% solids builds up on the filter drum and is continuously removed by a knife as the drum rotates. The paste (or filter cake) is collected and removed. The filtrate is returned to the center well of the thickener 2 for preprocessing.

In a typical operation of the type described above, 350 gallons per minute of aluminum rinse liquor enters a 10,000-gal. neutralizing tank where it is brought to pH 7.5–8.5 with spent acidic or alkaline waste liquor, forming a suspension of aluminum hydroxide (800 p.p.m.). It is then pumped to the thickener where a 0.025% solution of high molecular weight polyacrylamide resin is added. Flocculation occurs and the suspension is rapidly thickened and settles as a sludge in the thickener from which it is removed as an underflow at the rate of 40 gals./min. The overflow of 310 gals./min. is discharged to sewer or river at pH 6.5–8.5 and maximum suspended solids of 20 p.p.m. The underflow (2–4% solids) is fed to a drum-type vacuum filter coated with a filter pre-coat of diatomaceous earth. A filter cake consisting of 16–25% solids builds up on the drum and is removed with a knife, collected in a hopper and disposed of as waste, or treated with sulfuric acid to produce a 28% aluminum sulfate solution suitable as a flocculent for other water treatment. The diatomaceous earth is insoluble in the aluminum sulfate solution and can be removed by filtration. A roll discharge vacuum filter is also feasible. If a pressure filter is used instead of a vacuum filter, it is possible to produce a filter cake with 20–50% solids. With either filter, about 3 tons per day of a cake is produced which is substantially all aluminum hydroxide and which can be used as a commercial source of aluminum values.

In these operations the water which is used is ordinary municipal water of varying hardness and magnesium and calcium content. During the early operations, there is some precipitation of magnesium and calcium compounds in the thickener. With recirculation of the water in the system, however, magnesium and calcium values decrease and precipitation of compounds of these metals with aluminum hydroxide decreases. The temperature of the operation is usually ambient temperature (50–100° F.). It has been found that higher temperatures (100–120° F.) may be preferable and more rapid settling obtainable thereby.

The anionic flocculating agent used in this invention is preferably a polyacrylamide resin of molecular weight from about 500,000 to 3,000,000. This is a polymer of acrylamide, which has the formula $CH_2=CH-CONH_2$. The polymer can be represented as

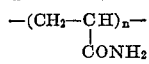

where $n$ is a large number between about 7,000 and 42,500. Related resins, such as those of homologs of acrylamide having the formula $R-CH=CH-CONH_2$ wherein R is methyl, ethyl or propyl, can also be used. The resins are soluble in water and are usually used as solutions of 0.05% to 0.1% concentration. In aqueous solution part of the amide groups are hydrolyzed to carboxyl groups, which are anionic in character. The hydrolysis is hastened by alkaline pH ranges. The resins are added to the aluminum hydroxide suspensions in quantities sufficient to make concentrations of 1 to 3 p.p.m.

The preferred form of polyacrylamide resin is that in which part (15–50%) of the amide groups are converted to carboxylic acid (or salt) radicals. They can be represented by the following general formula (for the sodium salt)

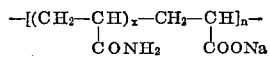

where $x$ is a number from about 2 to 4, inclusive, and $n$ is a number from about 1,400 to about 14,000.

These polymers have long straight chains with numerous anionic carboxyl groups spaced along the chains at intervals. The anionic groups form bonds between the polymers and the particles of aluminum hydroxide. Each polymer molecule thus agglomerates a number of aluminum hydroxide molecules and causes flocculation. The bonds are formed quickly and irreversibly and the settling of the aluminum hydroxide suspension occurs rapidly. Such polymers are commercially produced by Dow Chemical Company and by Betz Laboratories, Inc.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Method of recovering aluminum values from acid and alkaline waste liquor containing about 1% or less dissolved aluminum which comprises:
    (a) adjusting the pH of the liquor to 6 to 8.5, thus causing precipitation of aluminum hydroxide in suspension,
    (b) adding sufficient anionic polyacrylamide resin solution to produce a concentration of 1 to 4 p.p.m. of resin in the liquor for every 250–750 p.p.m. dissolved aluminum in said liquor,
    (c) thereafter allowing the aluminum hydroxide precipitate to settle in a thickener, to form a sludge having 2–4% solids,
    (d) withdrawing the supernatant liquid from said thickener,
    (e) withdrawing the sludge from the thickener,
    (f) filtering the sludge to remove the precipitate,
    (g) recycling the filtrate to the thickener, and
    (h) collecting the aluminum hydroxide filter cake from the filter.
2. Method of claim 1 wherein the filter cake contains 16–25% solids by weight.
3. Method of claim 1 wherein the filtration is carried out with a vacuum filter.
4. Method of claim 1 wherein the filtration is carried out with a pressure filter.
5. Method of claim 1 wherein the filtration is carried out with a roll discharge vacuum filter.

References Cited
UNITED STATES PATENTS

| | | | |
|---|---|---|---|
| 3,020,230 | 2/1962 | Smith | 210—54 |
| 3,086,845 | 4/1963 | Malley et al. | 23—143 |
| 3,147,218 | 9/1964 | Booth et al. | 210—54 |
| 3,541,009 | 11/1970 | Aernot et al. | 210—52 |

MILTON WEISSMAN, Primary Examiner

U.S. Cl. X.R.

210—52, 54; 423—127, 629